Aug. 14, 1945.    D. A. SEAVER ET AL    2,382,508
SKIN FASTENER
Filed April 7, 1944

INVENTORS
DONALD A. SEAVER and
PAUL E. FENTON
BY
ATTORNEY

Patented Aug. 14, 1945

2,382,508

UNITED STATES PATENT OFFICE 2,382,508

SKIN FASTENER

Donald A. Seaver, West Cheshire, and Paul E. Fenton, Middlebury, Conn., assignors to Scovill Manufacturing Company, Waterbury, Conn., a corporation of Connecticut Application April 7, 1944, Serial No. 529,900

11 Claims. (Cl. 85—5)

The present invention relates to skin fasteners or clamps of the type for temporarily assembling perforated members such as sheets or plates in aligned position.

In airplane construction and similar operations the sheets or other structures which are to be riveted together must be temporarily held in aligned position preparatory to the riveting operations. The clamps or fasteners acting as temporary rivets are inserted through the aligned rivet holes and removed as the riveting proceeds.

Inasmuch as the number of fasteners required, especially in aircraft construction, runs into many millions, it is essential that they are both simple and cheap to manufacture, that they are able to hold the sheets or other structure securely and in perfect alignment and vibration-free connection so as to withstand the stress resulting from the adjacent riveting operations, and that they may be applied and removed readily and safely by unskilled labor.

In the copending patent applications filed by Peter F. Rossmann, Serial No. 384,461, dated March 12, 1941, entitled "Clamping device," now Patent No. 2,371,470, and Serial No. 441,153, filed April 30, 1942, entitled "Fastener," now Patent No. 2,354,480, there is described a sheet fastener of this character at present being extensively used and comprising substantially a housing or body having a work engaging base provided with an opening of a size substantially equal to the diameter of the perforations in the aligned sheets or other work to be assembled. A retainer or clamping prong comprising a pair of resilient legs or fingers having heads or shoulders at the outer ends and operable towards each other is arranged to slide through said opening, a spreader mounted in relatively fixed relation to said body being interposed to space said legs apart. The retainer is urged inwardly of the body into retracted or clamping position by the provision of a coil spring interposed between its inner end and said body, whereby to urge said legs inwardly of said body and to cause said heads or shoulders to engage the outer surface of said base in the non-use condition of the fastener, or to resiliently clamp the perforated sheets or other work between said heads and said base in the operative or use position of the device.

The fastener is applied to and removed from the work by compressing the spring by the aid of a suitable tool such as a plier engaging the housing on the one hand and the inner end of the retainer on the other hand, in such a manner as to cause the legs of the retainer to project outwardly of the body beyond said spreader so as to be able to approach each other by their own spring tension or to flex sufficiently to permit of insertion through and removal from the sheet perforations.

Practice has shown that in order to insure safe riveting of the sheets or plates, a considerable clamping force is required to prevent misalignment of the sheets during the riveting operations and other drawbacks. This makes it necessary to employ a heavy clamping spring which in turn will require a substantial force to be exerted by the plier or other operating tool during the insertion and removal operations, resulting in considerable stress to which the clamps have to be subjected in use.

As a result of this, it has been experienced that the clamps may fly apart when parts thereof become accidentally damaged or broken during use, in particular when the heads or shoulders of the retainer are accidentally sheared or worn away. This may result in serious accidents and danger to workmen in the neighborhood.

Accordingly, an object of the present invention is to improve the safety factor of fasteners of this type by preventing the parts from being ejected forcibly in case one of the elements becomes accidentally damaged or broken.

A further object is to provide a fastener which is both simple in construction and efficient in operation and which can be readily and safely installed in and removed from the work without complicated tools or special operations.

Still another object is to provide a fastener of the above character which, while providing the necessary safety, will require only a limited number of additional elements and assembly operations compared with similar fasteners heretofore known and subject to the drawbacks and difficulties mentioned.

Another object is to provide a fastener embodying a heavy clamping spring to insure adequate clamping pressure in the operative or inserted position substantially without increasing the size or impairing its ready and safe application to and removal from the work.

Further objects and novel aspects of the invention will become more apparent from the following detailed description taken in reference to the accompanying drawing forming part of this specification and wherein.

Like reference characters identify like parts in the different views of the drawing.

Figure 1:
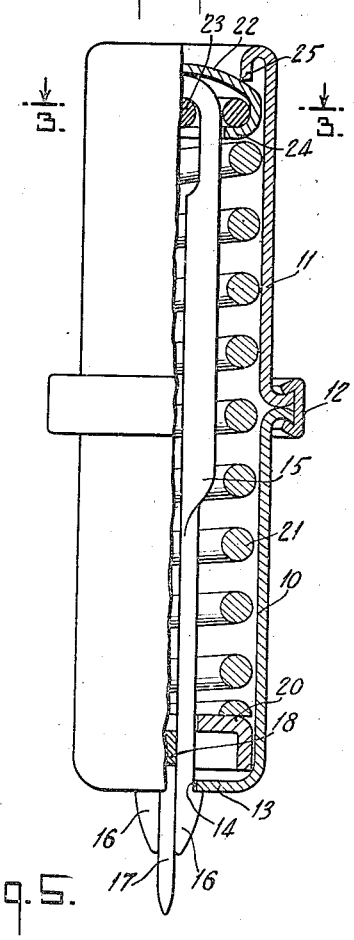
Fig. 1 is an elevational view, shown partly in cross-section, of a skin fastener constructed in accordance with the invention.

As more particularly shown in Fig. 1, items 10 and 11 represent the body portions of a cylindrical body or shell substantially enclosing the fastener elements and connected to each other in any suitable manner to provide an outwardly projecting collar or flange, such as by the aid of an annular band or ring 12 spun against the outwardly turned and slightly reversely bent edges of the shell members 10 and 11, as more clearly shown in the drawing.

Figure 2:
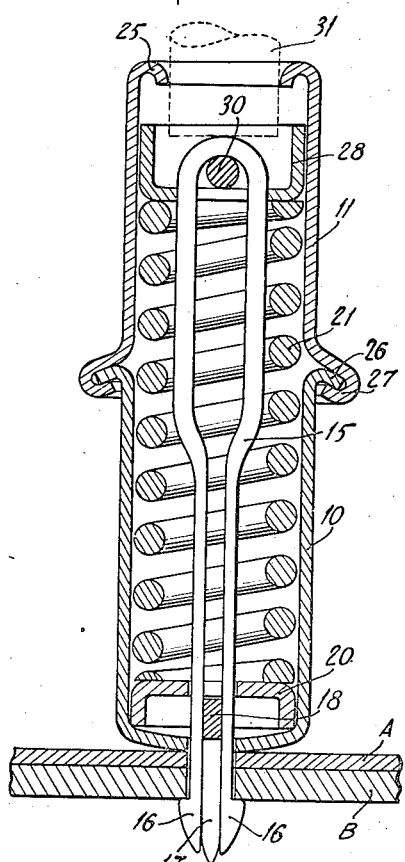
Fig. 2 shows a vertical cross-section of a modified fastener construction according to the invention.
Figure 5:
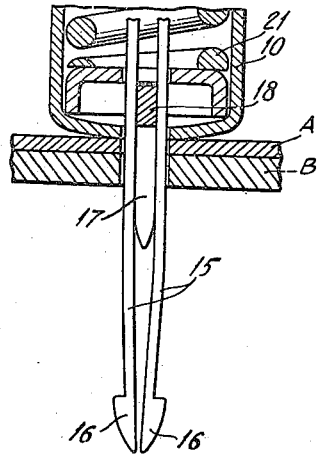
Fig. 5 is a further fragmentary view showing the fastener in the protracted position of the clamping prong for insertion into and removal from the sheet perforations.
Figure 3:
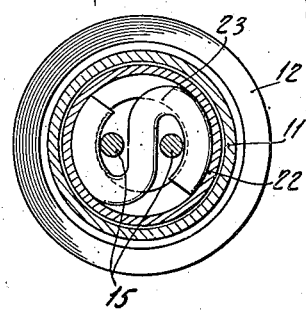
Fig. 3 is a sectional view taken on line 3—3 of Fig. 1.
Figure 4:
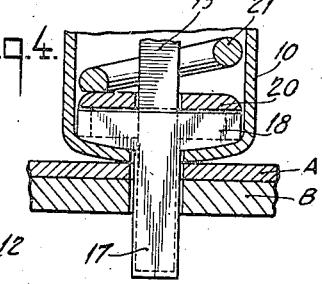
Fig. 4 is a fragmentary sectional view taken at right angles to the views shown in Figs. 1 and 2.

The lower body or shell member 10 has a closed bottom or base 13 provided with a central bore or opening 14 of a size substantially equal to the perforations in the members to be clamped, such as a pair of superposed sheets or plates A and B as shown in Figs. 2, 4 and 5. The bottom or sheet-engaging end wall 13 is suitably curved or rounded to avoid sharp edges or corners and to prevent marring of the sheets or other members being clamped.

There is furthermore provided a clamping prong or retainer 15 mounted within the body and slidable through the opening 14, said retainer comprising, in the example shown, a pair of resilient legs or fingers fashioned from a single length of wire bent into a U and having heads or shoulders 16 at their outer ends projecting outwardly from the body or bottom shell 10 of the fastener. The legs of the retainer 15, the outer ends of which are advantageously biased to be able to approach or become operable towards each other in the protracted position (see Fig. 5), are normally held in spaced-apart position by the provision of a spreader element 17 projecting through the opening 14 and being interposed between said legs.

Spreader 17 is held in relatively fixed relation to the body in any suitable manner, such as by the provision of a cross-bar or anchor portion 18 integral with the spreader portion 17 and resting against the inside of the bottom or end wall 13. An inverted cupped washer or cap 20 overlying the spreader cross-bar 18 is held against longitudinal movement by a coiled clamping spring 21 encircling the retainer 15 inside the housing, said spring having its lower end bearing upon washer 20 and having its upper end engaging a head secured to the inner end of the retainer 15. Washer 20 is provided with a suitable central opening for passing the legs of the retainer.

In the construction shown in Fig. 1, the head secured to the inner end of retainer 15 comprises a cap 22 and an S-shaped wire member 23 threaded through the looped end of the retainer legs or fingers. The head is completed by a cap 22 embracing and spun about the S-shaped member 23, whereby to firmly secure the cap to the retainer. As a result, the spring 21 tends to push the retainer 15 upwardly, whereby to urge the outer projecting ends of the retainer inwardly of the body and to cause the shoulders 16 to resiliently engage the underside of the base or end wall 13 in the non-use position or to engage the outermost sheet B in the operative or use position of the device.

The upper end of the top shell member 11 is suitably spun or rounded inwardly to act as a stop for cap 22 and retainer 15 and better to guide an operating tool such as a gun or plier applied to engage the flange 12 and having a plunger (see 31 in Fig. 2) adapted to enter the top shell for engaging the retainer and compressing the spring 21 and for causing the retainer legs to project outwardly of the shell or housing, as shown in Fig. 5, during the insertion and removing operations. As more clearly seen from Fig. 5 showing the protracted position of the retainer after compression of the spring 21, the outer ends of the legs or fingers carrying the heads or shoulders 16 will approach each other sufficiently by their own spring tension or may be flexed to enable their insertion into the sheet perforations, whereupon release of the spring 21 will result in the legs of the retainer being retracted against the body. This causes the heads or shoulders 16 to be resiliently clamped against the lowermost sheet B in the inserted or use position more clearly shown in Figs. 2 and 4. For removal, the spring 21 is compressed in a similar manner, whereby to allow the fastener to be withdrawn from the work in a manner readily understood.

The legs of the retainer 15 may be such that in the non-use position shown in Fig. 1, the shoulders or heads 16 resiliently engage the underside of bottom 13, and that cap 22 will just abut against the inner inturned edge 25 of the top shell 11. Alternatively, a normal spacing may be provided between the cap 22 and the upper edge of top shell 11. In either case, damage or breakage of the head 16 or of any other part of the fastener will prevent a forceful ejection of the retainer 15 or spring 21 by the inturned edge or flange 25 acting as a stop, whereby to substantially avoid operator hazard and other disadvantages. At the same time, the complete enclosure of the clamp parts, in particular of the spring 21, by the body shell or housing, eliminates any possibility of canting of the spring portion projecting from the housing, as used in previous constructions known in the prior art, resulting in greater ease and safety during the insertion and removal operations and other advantages.

Fig. 2 shows a modified construction similar to Fig. 1, wherein the band 12 is omitted and the top and bottom shells are connected by an interfolding arrangement to provide a collar for engagement with an operating tool such as a gun or plier well known in the use and operation of devices of this type. For this purpose, the bottom shell 10 is provided with a flange 26 bent at an angle to the outer shell surface and around which is folded or spun the edge 27 of the top shell 11 to insure a firm mechanical connection and to provide a suitable flange or collar for engagement by the operating tool in the manner shown and understood.

The head at the inner end of retainer 15 is also somewhat different from Fig. 1, and comprises a cup or head member 28 provided with a transverse pin 30 engaging the looped portion of the retainer 15 passing through a central opening of the member 28. In the non-use position or upon breakage of the shoulders 16, the upper edge of the head member 28 will engage the groove or channel provided by the inwardly spun edge 25 of the top shell 11, whereby to prevent operator hazard and other defects in a manner understood from the foregoing.

The spreader cross-arm 18 may be mounted freely within the recess provided by the overlying washer 20, fitting therein either snugly or loosely. Alternatively, the spreader cross-arm 18 may be secured to the washer 20 by engaging diametrical recesses in the latter, or in any other suitable manner, as more clearly seen from Fig. 4. If desirable, the washer 20 may be omitted, in which case the spreader will be held against the bottom 13 by direct engagement with the lower end of the spring 21. Furthermore, the retainer 15 may be constructed of separate legs secured together at their inner ends by a sleeve or in any other suitable manner.

It will be evident that the invention is not limited to the specific details and constructions shown and disclosed herein for illustration, but that the underlying principle and novel thought are susceptible of numerous variations and modifications coming within the broader scope and spirit of the invention as defined in the appended claims. The specification and drawing are accordingly to be regarded in an illustrative rather than in a limiting sense.

We claim:

1. In a clamp device, a cup-shaped body having a base provided with an opening, a retainer within said body slidable through said opening and having at least one lateral projection at the outer end thereof, a head at the inner end of said retainer, and a coil spring encircling said retainer and interposed between said head and said body, to normally retract said retainer inwardly of said body and to urge said projection into clamping engagement with said base, said body comprising two concentric cylindrical portions having their adjacent edges bent outwardly and secured to each other to form an annular collar and having its inner free edge spun inwardly to form a stop for said retainer.

2. In a clamp device, a cup-shaped body having a base provided with an opening, a retainer within said body slidable through said opening and having at least one lateral projection at the outer end thereof, a head at the inner end of said retainer, and a coil spring encircling said retainer and interposed between said head and said body, to normally retract said retainer inwardly of said body and to urge said projection into clamping engagement with said base, said body comprising two cylindrical portions having their adjoining edges bent outwardly and a band spun into engagement therewith to form a projecting collar, and the inner free edge of said body being spun inwardly to form a stop for said retainer.

3. In a clamp device, a cup-shaped body having a base provided with an opening, a retainer within said body having a pair of resilient legs slidable through said opening and provided with shoulders at their outer ends, a head at the inner end of said retainer, a spreader resting against the inside of said base and having a portion projecting through said opening and interposed between said legs, whereby to space said legs apart, a coil spring encircling said retainer having one end engaging said head and having its other end arranged to maintain said spreader in bearing engagement with said base, to normally retract said retainer inwardly of said body and to urge said shoulders into clamping engagement with said base, said body comprising two cylindrical portions having their adjoining edges bent outwardly and a band spun into engagement therewith to form a projecting collar, and the inner free edge of said body being spun inwardly to form a stop for said retainer.

4. In a clamp device, a cup-shaped body having a base provided with an opening, a hair-pin shaped retainer within said body slidable through said opening and having a pair of resilient legs provided with shoulders at the outer ends thereof, an S-shaped member threaded through the looped end of said retainer, a cap embracing and spun into engagement with said member to form a head for said retainer, a spreader resting against the inside of said base and having a depending portion projecting through said opening and interposed between said legs, whereby to space said legs apart, said legs and interposed spreader portion forming a cross-sectional dimension of a diameter substantially conforming to the diameter of said opening, and a coil spring encircling said retainer having one end engaging said head and arranged to have its opposite end maintain said spreader in bearing engagement with said base, to normally retract said retainer inwardly of said body and to urge said shoulders into clamping engagement with said base, said body comprising two cylindrical portions having their adjoining edges bent outwardly and a band spun into engagement therewith to form a projecting collar, and the inner free end of said body being spun inwardly to form a stop for said retainer.

5. In a clamp device, a body, a hair-pin shaped retainer slidable with respect to said body and having legs provided with clamping means at the outer end thereof, a head at the inner end of said retainer comprising an S-shaped member threaded through the looped end of said retainer and a cap embracing said member, and a clamping spring interposed between said body and said head to normally retract said retainer into clamping engagement with said body.

6. In a clamp device, a body provided with an opening, a hair-pin shaped retainer slidable through said opening and having a pair of resilient legs provided with shoulders at the outer ends thereof, a spreader in relatively fixed relation to said body and interposed between said legs, a head at the inner end of said retainer comprising an S-shaped member threaded through the looped end of said retainer and a cap embracing said member, and a coil spring encircling said retainer between said body and interposed between said body and said head, to normally retract said retainer into clamping engagement of said shoulders with said body.

7. In a clamp device, a body, a hair-pin shaped retainer slidable with respect to said body and having legs provided with clamping means at their outer ends, an S-shaped wire member threaded through and engaging the inner looped end of said retainer, a cap embracing and spun over said member to form a head for said retainer, and a coiled clamping spring encircling said retainer and having its opposite ends engaging said cap and said body respectively, to normally retract said retainer into clamping engagement with said body.

8. In a clamp device, a body having a base provided with an opening, a hair-pin shaped retainer slidable through said opening and having a pair of resilient legs provided with shoulders at their outer ends, a spreader in relatively fixed relation to said body projecting through said opening and interposed between said legs, to space said legs apart, said legs and spreader forming a cross-sectional dimension of a diameter substantially conforming to the diameter of said opening, an S-shaped wire member threaded through the looped inner end of said retainer, a cap embracing and spun around said member to form a head for said retainer, and a coiled clamping spring encircling said retainer and interposed between said head and body, to normally retract said retainer inwardly of said body and to urge said shoulders into clamping engagement with said base.

9. In a clamp device, a body having a base provided with an opening, a hair-pin shaped retainer slidable through said opening and having a pair of resilient legs provided with shoulders at their outer ends, a spreader resting against the inside of said base and having a portion projecting through said opening and interposed between said legs, whereby to space said legs apart, said legs and interposed spreader portion forming a cross-sectional dimension of a diameter substantially equal to the diameter of said opening, an S-shaped wire member threaded through the looped inner end of said retainer, a cap embracing and spun around said member to form a head for said retainer, a coiled clamping spring encircling said retainer having one end engaging said head and having its other end arranged to maintain said spreader in bearing engagement with said base, to normally retract said retainer inwardly of said body and to urge said shoulders into clamping engagement with said base.

10. In a clamp device, a cup-shaped body having a base provided with an opening, a retainer within said body slidable through said opening and having at least one lateral projection at the outer end thereof, a head at the inner end of said retainer, a coil spring encircling said retainer and interposed between said head and said body to normally retract said retainer inwardly of said body and to urge said projection into clamping engagement with said base, said body comprising two concentric cylindrical portions having their adjacent edges bent outwardly and secured to each other to form an annular collar, and stop means for said head at the inner end of said body to limit the inward movement of said retainer.

11. In a clamp device, a cup-shaped body having a base provided with an opening, a retainer within said body slidable through said opening and having at least one lateral projection at the outer end thereof, a head at the inner end of said retainer, a coil spring encircling said retainer and interposed between said head and said body to normally retract said retainer inwardly of said body and to urge said projection into clamping engagement with said base, said body comprising two concentric cylindrical portions having their adjoining edges bent outwardly and a band spun into engagement therewith to form a projecting collar, and stop means for said head at the inner end of said body to limit the inward movement of said retainer.

DONALD A. SEAVER.
PAUL E. FENTON.